(12) United States Patent
Tahan

(10) Patent No.: US 8,037,318 B2
(45) Date of Patent: Oct. 11, 2011

(54) SYSTEM AND METHODS FOR DEPENDENT TRUST IN A COMPUTER SYSTEM

(75) Inventor: Thomas Tahan, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 1178 days.

(21) Appl. No.: 11/229,189

(22) Filed: Sep. 15, 2005

(65) Prior Publication Data

US 2009/0150899 A1 Jun. 11, 2009

Related U.S. Application Data

(60) Provisional application No. 60/629,175, filed on Nov. 17, 2004.

(51) Int. Cl.
*G06F 11/30* (2006.01)
(52) U.S. Cl. ............... 713/189; 713/192; 713/194
(58) Field of Classification Search .......... 713/164–167, 713/172–189, 192, 194
See application file for complete search history.

(56) References Cited

U.S. PATENT DOCUMENTS

| | | | |
|---|---|---|---|
| 5,937,063 A | 8/1999 | Davis | |
| 6,609,199 B1 | 8/2003 | DeTreville | |
| 6,996,710 B1 * | 2/2006 | Ellison et al. | 713/156 |
| 7,480,806 B2 * | 1/2009 | Grawrock | 713/189 |
| 2003/0074548 A1 | 4/2003 | Cromer et al. | 713/1 |
| 2004/0193888 A1 * | 9/2004 | Wiseman et al. | 713/176 |
| 2005/0033987 A1 * | 2/2005 | Yan et al. | 713/201 |
| 2005/0216736 A1 * | 9/2005 | Smith | 713/168 |
| 2005/0246525 A1 * | 11/2005 | Bade et al. | 713/164 |
| 2005/0246552 A1 * | 11/2005 | Bade et al. | 713/193 |
| 2005/0289347 A1 * | 12/2005 | Ovadia | 713/171 |
| 2007/0256125 A1 * | 11/2007 | Chen et al. | 726/18 |

FOREIGN PATENT DOCUMENTS

| | | |
|---|---|---|
| EP | 1 076 279 | 2/2001 |
| EP | 1 280 042 | 1/2003 |
| GB | EP 1076280 | 2/2001 |
| GB | EP 1225513 A1 | 7/2002 |
| GB | EP 1617587 A1 | 1/2006 |
| WO | WO 01/27723 | 4/2001 |
| WO | WO 2006/002368 | 1/2006 |

OTHER PUBLICATIONS

Chris Hageman, "The Trusted PC: Current Status of Trusted Computing", Jun. 23, 2003, GSEC Practical Assignment Version 1.4b, SANS Institute, pp. 1-17.*

* cited by examiner

*Primary Examiner* — Edward Zee
*Assistant Examiner* — Chi Nguy
(74) *Attorney, Agent, or Firm* — Martine Penilla & Gencarella, LLP

(57) ABSTRACT

A method for dependent trust in a computer system is provided. In this method, trust dependency relationships are defined among components of the computer system, specifying, for a component, which components it relies on in ensuring the integrity or confidentiality of its code or data. Subsequently, trust dependencies are resolved and the results are used in performing certain operations described in Trusted Computing Group standards including generating an attestation reply, sealing data, and unsealing data. In addition, methods for computing an integrity measurement for a Core Root of Trust for Measurement of a trust-dependent component are included. A system for dependent trust in a computer system is also described.

29 Claims, 15 Drawing Sheets

*Indicates that X is trust-dependent on Y.*

*Indicates that X is trust-dependent on Y.*

Indicates that X is trust-dependent on Y.

*Partition A and Partition B have a M-CRTM, measured by the Partitioning Layer.*

*Partition A and Partition B have a M-CRTM, measured by the Partitioning Layer.*

SYSTEM AND METHODS FOR DEPENDENT TRUST IN A COMPUTER SYSTEM

CROSS REFERENCE TO RELATED APPLICATION

This application claims the benefit of U.S. Provisional Application 60/629,175, which was filed on Nov. 17, 2004. The disclosure of the provisional application is incorporated herein by reference.

BACKGROUND

Computer systems are often comprised of components, where a component typically is embodied as an execution domain in which software may execute in isolation from other components, potentially affected by only the other components on which there is an acknowledged trust dependency. An example is a layered computer platform. With layering implemented in hardware, software, or a combination of hardware and software, each layer will consist of one or more components. The layered computer platform architecture is often constructed with a hierarchical privilege model. Each layer is more privileged than the layers above it. A layer having higher privilege is allowed to control and potentially corrupt the layers above it that have less or lower privileges. In such layered computer platform architecture, components in the upper layers are trust-dependent on components in the layers below them. In general, a component is trust-dependent on another component if it relies on another component in ensuring the integrity or confidentiality of its code or data. The Trusted Computing Group (TCG) has developed standards to ensure the security and integrity of a computing platform. The current standards do not address systems with trust dependencies.

According to TCG standards, there are Trusted Building Blocks (TBBs) for a platform which form the root of trust for the platform. These include a Trusted Platform Module (TPM) and a Core Root of Trust for Measurement (CRTM). A CRTM is the root of trust from which integrity measurements begin within a trusted computer platform. The TPM provides secure storage and reporting for the integrity measurements and other data. The platform manufacturer provides CRTM logic for each trusted computer platform. The CRTM logic can be changed, however, changes can only be made by the manufacturer of the computer platform. In addition, the changes can only be made under controlled conditions. TCG specifies two types of CRTM: a Static CRTM (S-CRTM) and a Dynamic CRTM (D-CRTM).

In platforms with an S-CRTM, the S-CRTM is the first module to be executed after the platform is reset. The S-CRTM computes an integrity measurement of the next code in the boot sequence (e.g., using a one-way hash algorithm (e.g., SHA-1)), and records the integrity measurement in a Platform Configuration Register (PCR) within the TPM. Boot control is then transferred to the code that was measured, which in turn measures and records the next code that is loaded. This process is continued and repeated until the platform is booted and applications of the platform are running.

In computer platforms with a D-CRTM, the D-CRTM may be invoked at any time after the platform is reset. The D-CRTM sets up a trusted computing environment, measures the first code to run in that environment and stores that measurement in a PCR within the TPM. The D-CRTM asserts "locality", which provides an indicator to the TPM that the measurement came from a D-CRTM rather than an S-CRTM, and the TPM divides its PCRs among localities asserted by the D-CRTM. Subsequently, code continues to be booted in the trusted computing environment, with the code that is loaded into the computer platform being integrity measured and the measurements recorded in the TPM.

As part of the integrity measurement process, a measurement log is maintained by the components in the chain of trust. The measurement log contains information on what measurements were taken, in what order, and in which of the PCRs the measurements were stored.

A computer system that is comprised of components may have multiple TBBs, one for each component, and there may be trust dependencies among the components. Thus, a PCR in one component may be trust-dependent on PCRs in another component. For TPM operations that use PCRs, methods are needed to define and resolve the trust dependencies.

SUMMARY

Broadly speaking, the present invention provides a method for dependent trust in a computer system. In one method, trust dependency relationships are defined among components of the computer system, specifying, for a component, which components it relies on in ensuring the integrity or confidentiality of its code or data. Subsequently, trust dependencies are resolved and the results are used in performing certain operations described in Trusted Computing Group standards including generating an attestation reply, sealing data, and unsealing data. In addition, methods for computing an integrity measurement for a Core Root of Trust for Measurement of a trust-dependent component are included. A system for dependent trust in a computer system is also described.

In one embodiment, a method for dependent trust in a computer system is disclosed. The method includes: (a) defining a trust dependency relationship among components of the computer system, the trust dependency relationship among components is identified, (i) by one or more trust-determinant components that a trust-dependent component is trust-dependent on, and (ii) by a set of Platform Configuration Registers (PCRs) in a trust-determinant component's Trusted Platform Module (TPM) that a first PCR in the trust-dependent component's TPM is trust-dependent upon. The method further includes: (b) resolving the trust dependency, the resolving including, (i) retrieving from the trust-determinant component's TPM PCR values upon which the first PCR in the trust-dependent component's TPM is trust-dependent; (ii) combining the retrieved PCR values with a value in first PCR to yield a resolved PCR; (iii) retrieving from the trust-determinant component measurement logs for PCRs upon which the first PCR is trust-dependent; and (iv) combining the retrieved measurement log with the measurement log of first PCR to yield a resolved measurement log. Then, the method includes: (c) performing an operation using the resolved trust dependency.

In another embodiment, a method for configuring dependent trust in a computer system is disclosed. The method includes defining a trust dependency relationship among components of the computer system and resolving the trust dependency. Next, the method includes performing an operation using the resolved trust dependency. The trust-determinant component computes an integrity measurement for a Core Root of Trust for Measurement (CRTM) of a trust-dependent component. The method thereafter records the integrity measurement of a Measured-CRTM (M-CRTM) in a PCR of a TPM. In this embodiment, the TPM can be that of the trust dependent or trust determinant component. The PCR containing the measurement of the M-CRTM is trust-dependent on the PCR or PCRs in the trust-determinant component's TPM containing the integrity measurements of the chain of trust that computed the measurement for the M-CRTM. The other PCRs in the trust-dependent component's TPM are trust-dependent on the PCR containing the measurement of the M-CRTM.

Other aspects and advantages of the present invention will become apparent from the following description, taken in conjunction with the accompanying drawings, illustrating by way of examples the principles of the invention.

BRIEF DESCRIPTION OF THE DRAWINGS

The present invention will be readily understood by the following detailed description in conjunction with the accompanying drawings, and like reference numerals designating like structural elements.

DETAILED DESCRIPTION

The present invention, as illustrated by the following embodiments, provides the systems and methods for dependent trust in a computer system. More specifically, embodiments of the present invention apply to a computer system consisting of multiple components. A component typically is embodied as an execution domain in which software may execute in isolation from other components except where there is a trust dependency. We say that a component X is trust-dependent on a component Y when either: (1) X relies on Y in ensuring the integrity of X's code or data, i.e., that X's code or data cannot be modified by entities external to X or Y except as authorized by X or a trusted system administrator for X; (2) X relies on Y in ensuring the confidentiality of X's code or data, i.e., that X's code or data cannot be not disclosed to entities external to X or Y except as authorized by X or a trusted system administrator for X; or (3) both (1) and (2). Also, when X is trust-dependent on Y, we say that Y is a trust-determinant of X. As should be appreciated, the present invention can be implemented in numerous ways, including systems or methods. In some instances, well known process operations and components have not been described in detail in order to avoid obscuring the embodiments of the present invention.

Figure 1:
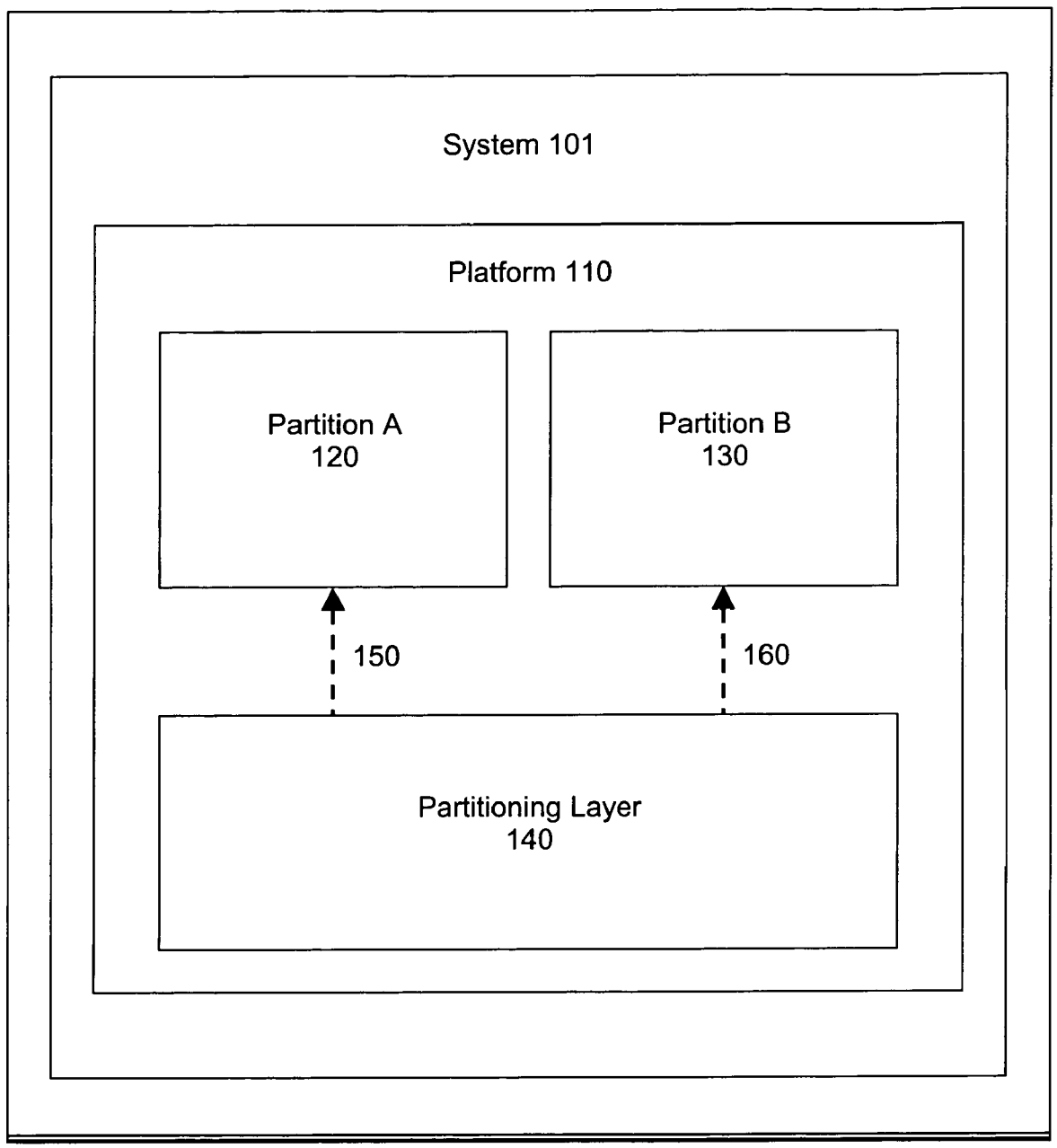
FIG. 1 is a diagram of a dual-layer, partitioned computer system showing trust dependencies of the upper layer partitions on the partitioning layer below them.
Figure 1:
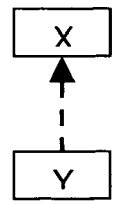

FIG. 1 is a diagram showing one embodiment of the invention, a dual-layer, partitioned computer system 101 comprised of Platform 110. Platform 110 has a dual-layer architecture, with Partitioning Layer 140 as the most privileged layer responsible for partitioning the platform. Above, i.e., less privileged than, Partitioning Layer 140 are Partition A 120 and Partition B 130. Partition A 120, Partition B 130, and Partitioning Layer 140 are examples of components as the term is used in this invention. Although only two partitions are shown, there could be any number from one up to an implementation dependent limit. A dashed arrow 150 shows that Partition A 120 is trust-dependent on Partitioning Layer 140. In the figure, a second dashed arrow 160 shows that Partition B 130 is trust-dependent on Partitioning Layer 140. It should be noted that trust dependencies may be within a component as well as across components.

Figure 2:
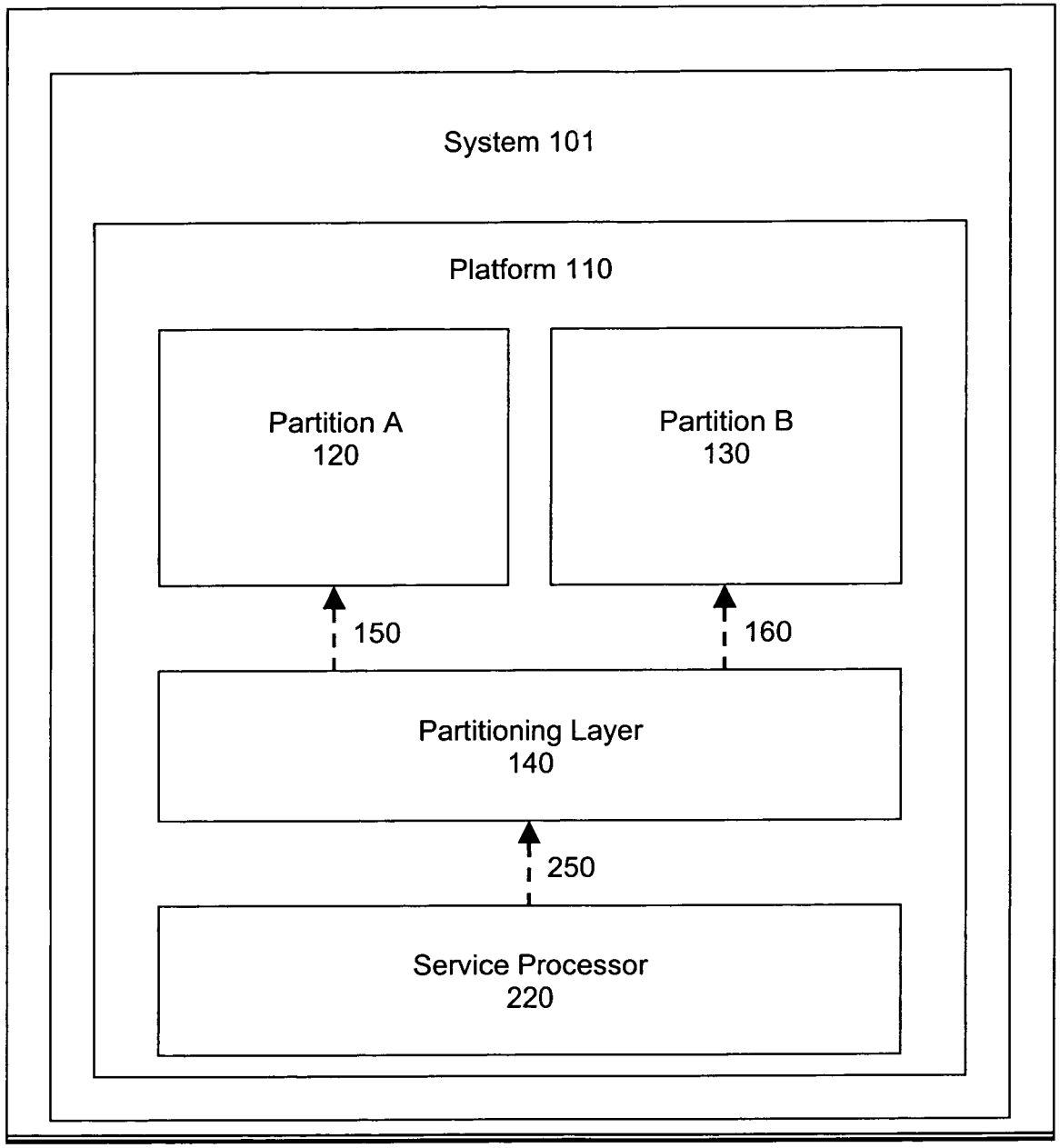
FIG. 2 is a diagram of a tri-layer, partitioned computer system showing trust dependencies among the layers.
Figure 2:
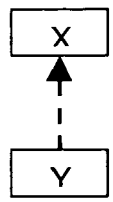

FIG. 2 is a diagram showing one embodiment of the invention, a tri-layer, partitioned computer system 101 comprised of Platform 110. Platform 110 has a tri-layer architecture, with Service Processor 220 being the most privileged and the Partitioning Layer 140 being the next the most privileged layer responsible for partitioning the platform. Above, i.e., less privileged than, Partitioning Layer 140 are Partition A 120 and Partition B 130. Although only two partitions are shown, there could be any number from one up to an implementation dependent limit. A dashed arrow 150 shows that Partition A 120 is trust-dependent on Partitioning Layer 140. A second dashed arrow 160 shows that Partition B 130 is trust-dependent on Partitioning Layer 140. A third dashed arrow 250 shows that Partitioning Layer 140 is trust-dependent on Service Processor 220. A system could have any number of layers with trust dependencies.

Figure 3:
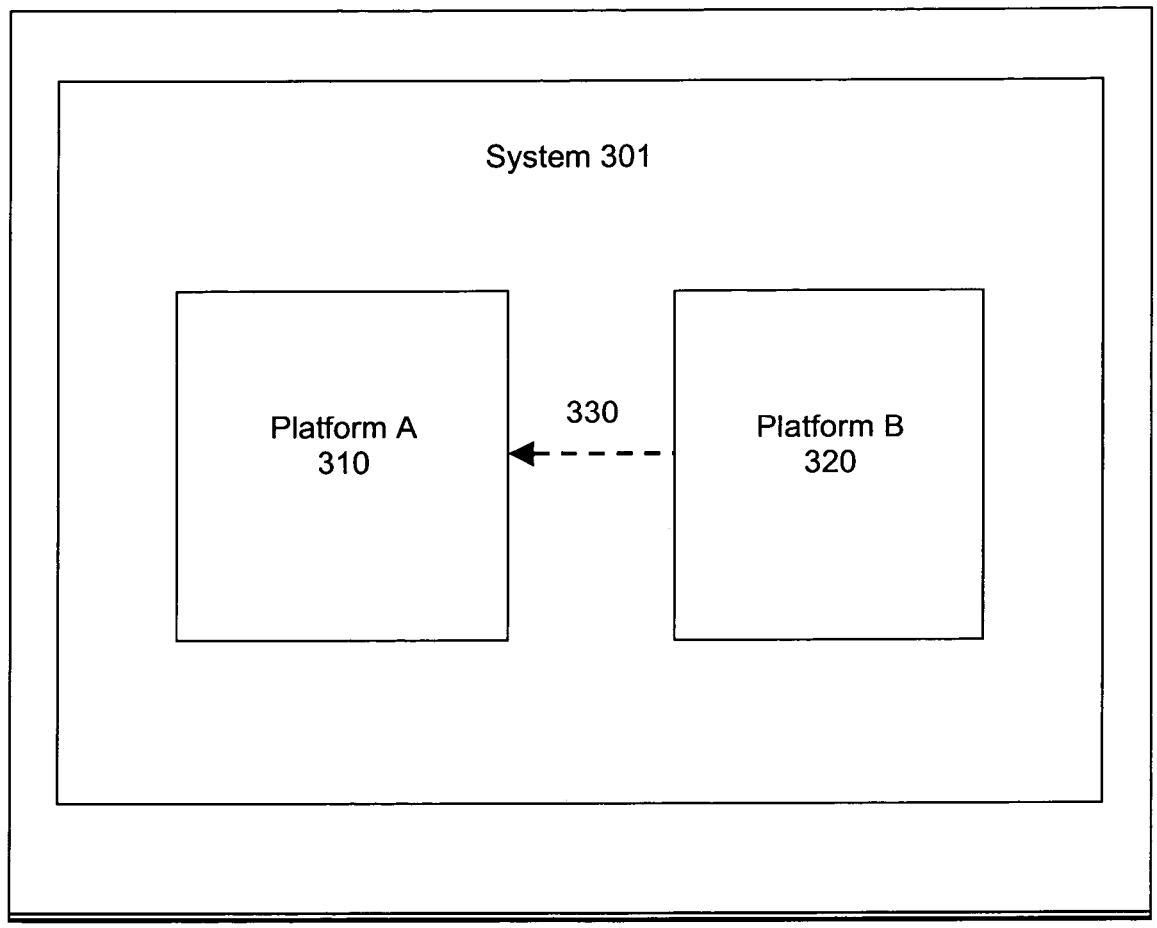
FIG. 3 is a diagram of two platforms with a trust dependency.
Figure 3:
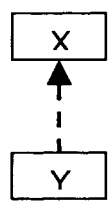

FIG. 3 is a diagram showing one embodiment of the invention, computer system 301 comprised of two platforms, Platform A 310 and Platform B 320, with a trust dependency. The dashed arrow 330 indicates that Platform A 310 is trust-dependent on Platform B 320. As an example embodiment, consider the case where Platform B 320 is a Secure Sockets Layer (SSL) proxy for Platform A 310. In that case, Platform B 320 sits between Platform A 310 and the network (e.g., Internet or Intranet), and performs SSL processing on packets transmitted between the network and Platform A 310. The security of Platform A's (310) processing, including the confidentiality and integrity protections for the data transmitted over the network, is performed by Platform B 320 on behalf of Platform A 310. Thus, Platform A 310 is a trust-dependent component, dependent on trust-determinant component Platform B 320. A system could be comprised of more than two platforms, or multiple layered platforms with trust dependencies.

Figure 4:
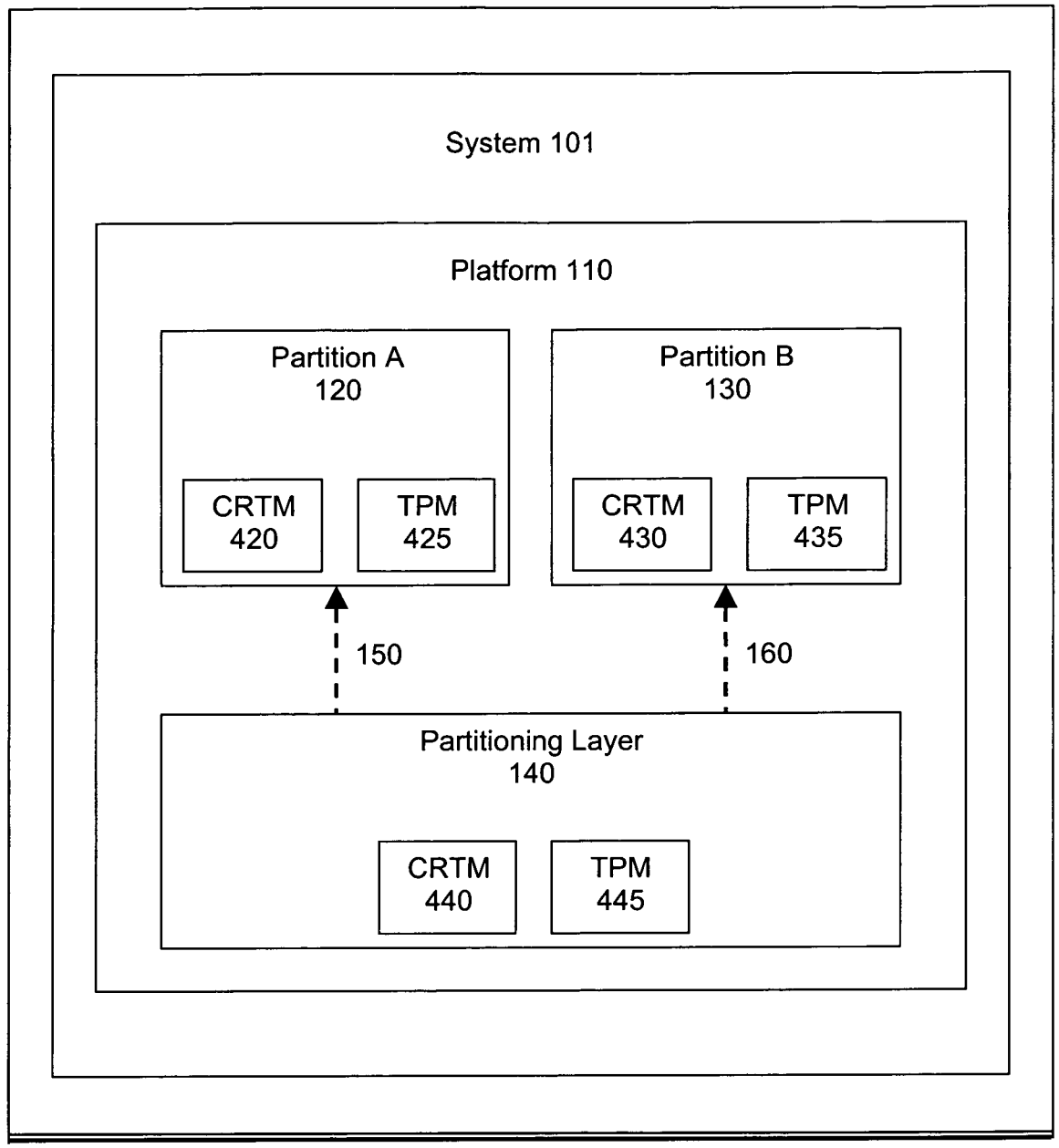
FIG. 4 is a diagram of a layered computer system showing trust dependencies between layers and the trusted building blocks in each layer.
Figure 4:
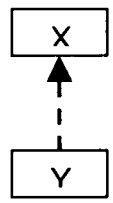

FIG. 4 is a diagram showing one embodiment of this invention, a layered computer system 101. The figure shows trust dependencies between layers and the Trusted Computing Group (TCG) Trusted Building Blocks (TBBs) in each layer. System 101 is comprised of Platform 110. Platform 110 has a dual-layer architecture, with Partitioning Layer 140 as the most privileged layer responsible for partitioning the platform. Above, i.e., less privileged than, Partitioning Layer 140 are Partition A 120 and Partition B 130. Although only two partitions are shown, there could be any number from one up to an implementation-dependent limit. A dashed arrow 150 shows that Partition A 120 is trust-dependent on Partitioning Layer 140. A second dashed arrow 160 shows that Partition B 130 is trust-dependent on Partitioning Layer 140. The figure also shows the TCG TBBs of Partition A 120, Partition B 130, and Partitioning Layer 140, in accordance with TCG standards. For Partition A 120, the TBBs are CRTM 420 and TPM 425. For Partition B 130, the TBBs are CRTM 430 and TPM 435. For the Partitioning Layer 140, the TBBs are CRTM 440 and TPM 440.

Figure 5:
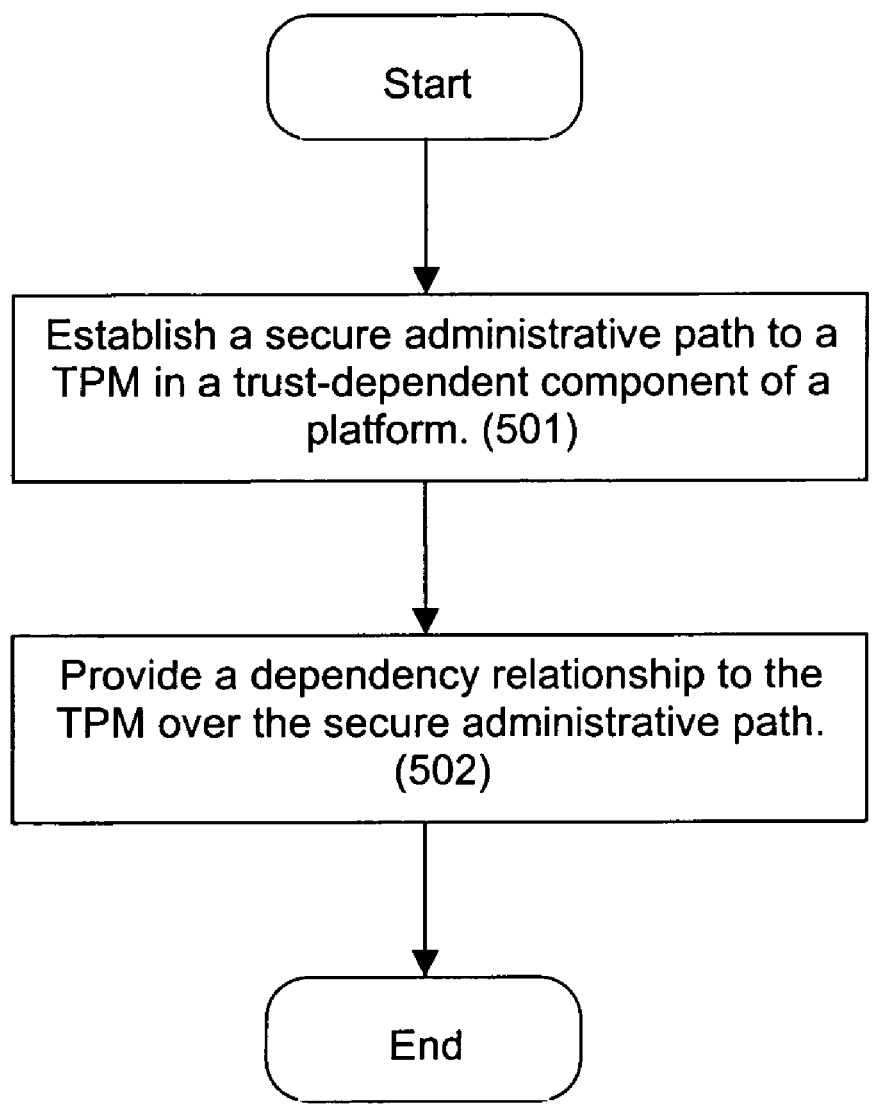
FIG. 5 is a flowchart detailing a process of defining a trust dependency relationship in a layered computer platform, in accordance with one embodiment of the present invention.

FIG. 5 is a flowchart detailing a process of defining a dependency relationship in a computing platform, in accordance with one embodiment of the present invention. In operation 501, a trusted system administrator establishes a secure administrative path to a TPM in a trust-dependent component. Then, in operation 502, the trusted system administrator defines dependency relationships between PCRs in the TPM of the trust-dependent component and PCRs in the TPM of the trust-determinant component. The dependency definition process detailed in FIG. 5 is one possible method. In another embodiment, the trust dependency relationships are built into the system during development and do not need to be configured by an external entity. In yet another embodiment, a system may have a combination of built-in and configured dependency relationships. In yet another embodiment, the trusted system administrator may establish a secure administrative path with a trust-determinant component's TPM and provide to it trust dependency relationships definitions.

Figure 6:
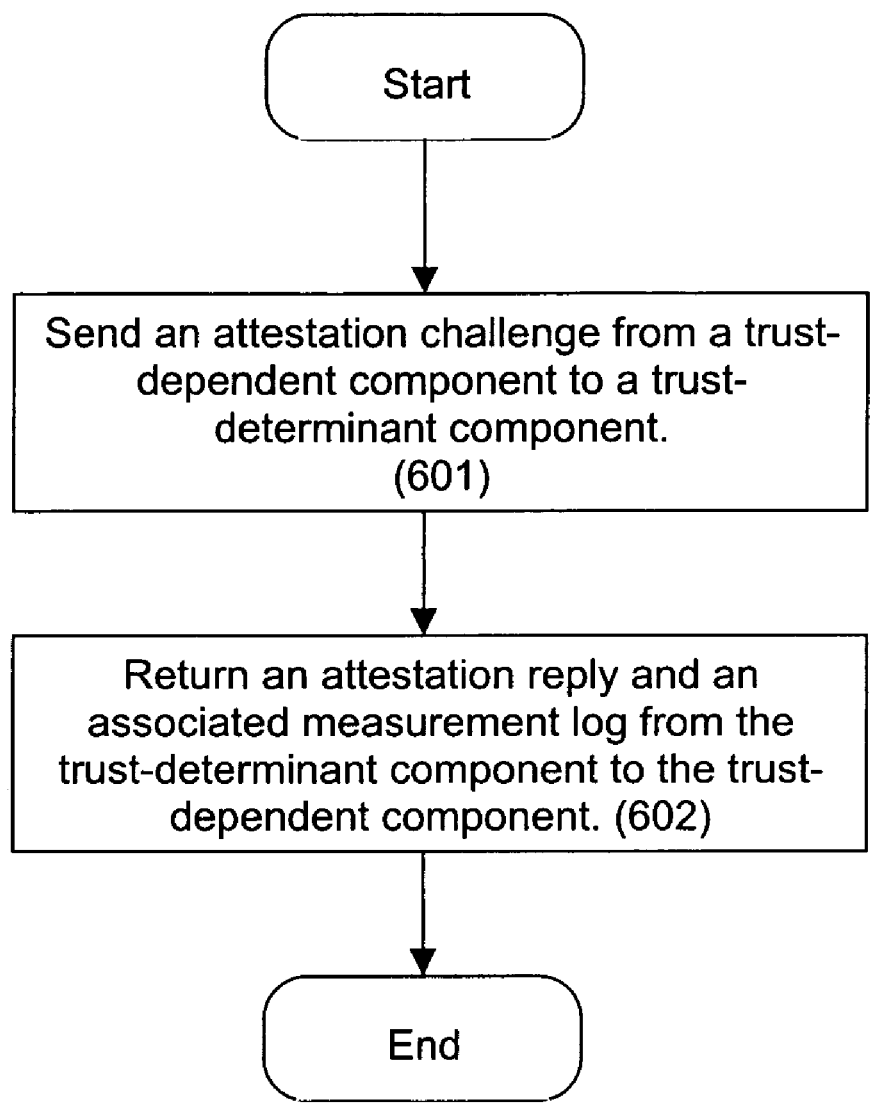
FIG. 6 is a flowchart detailing a process of a trust-dependent component obtaining a trust-determinant component's integrity measurements and integrity measurement log using attestation.

FIG. 6 is a flowchart detailing a process of a trust-dependent component obtaining a trust-determinant component's integrity measurements and integrity measurement log using attestation, according to one embodiment. In 601, the trust-dependent component sends a TCG attestation challenge to the trust-determinant component, requesting the value stored in certain PCRs of the trust-determinant component's TPM. Then, in 602, the trust-determinant component sends an attestation reply to the trust-dependent component, returning the requested PCRs and relevant measurement log entries.

Figure 7:
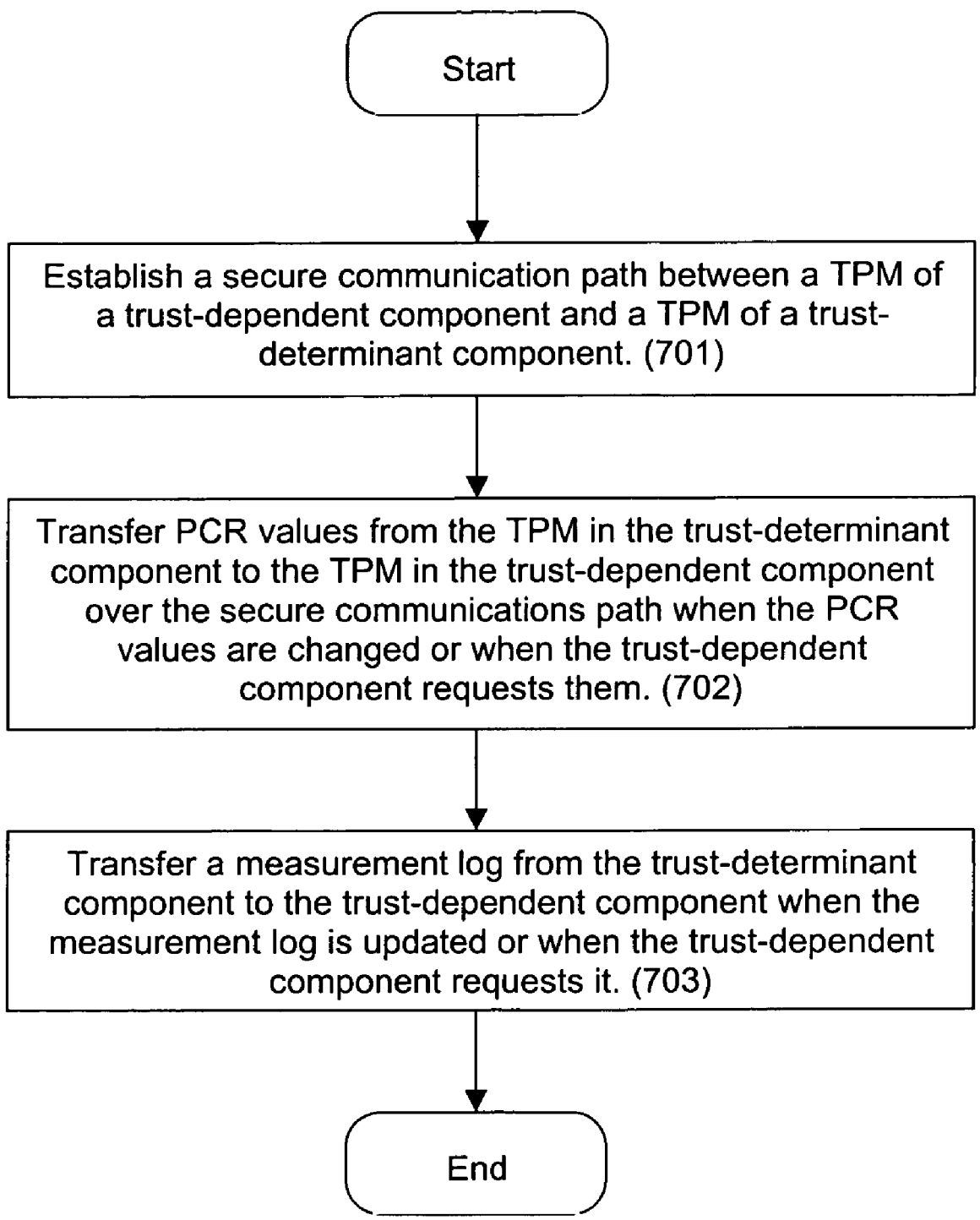
FIG. 7 is a flowchart detailing a process of transferring integrity measurements from a trust-determinant component's Trusted Platform Module (TPM) to a trust-dependent component's TPM.

FIG. 7 is a flowchart detailing a process of transferring integrity information from a trust-determinant component to a trust-dependent component, according to one embodiment. In 701, a secure communications path is established between a TPM of a trust-dependent component and a TPM of a trust-determinant component. Methods for establishing the secure communications path include cryptographic methods or protected hardware methods.

Once the secure communications path is established, values (i.e., integrity measurements) stored in PCRs may be transferred from the TPM of the trust-determinant component to the TPM of the trust-dependent component whenever these values change or when the trust-dependent component requests them (702). Additionally, when such transfers take place, the measurement log associated with the transferred PCR is transferred from the trust-determinant component to the trust-depended component (703).

Figure 8:
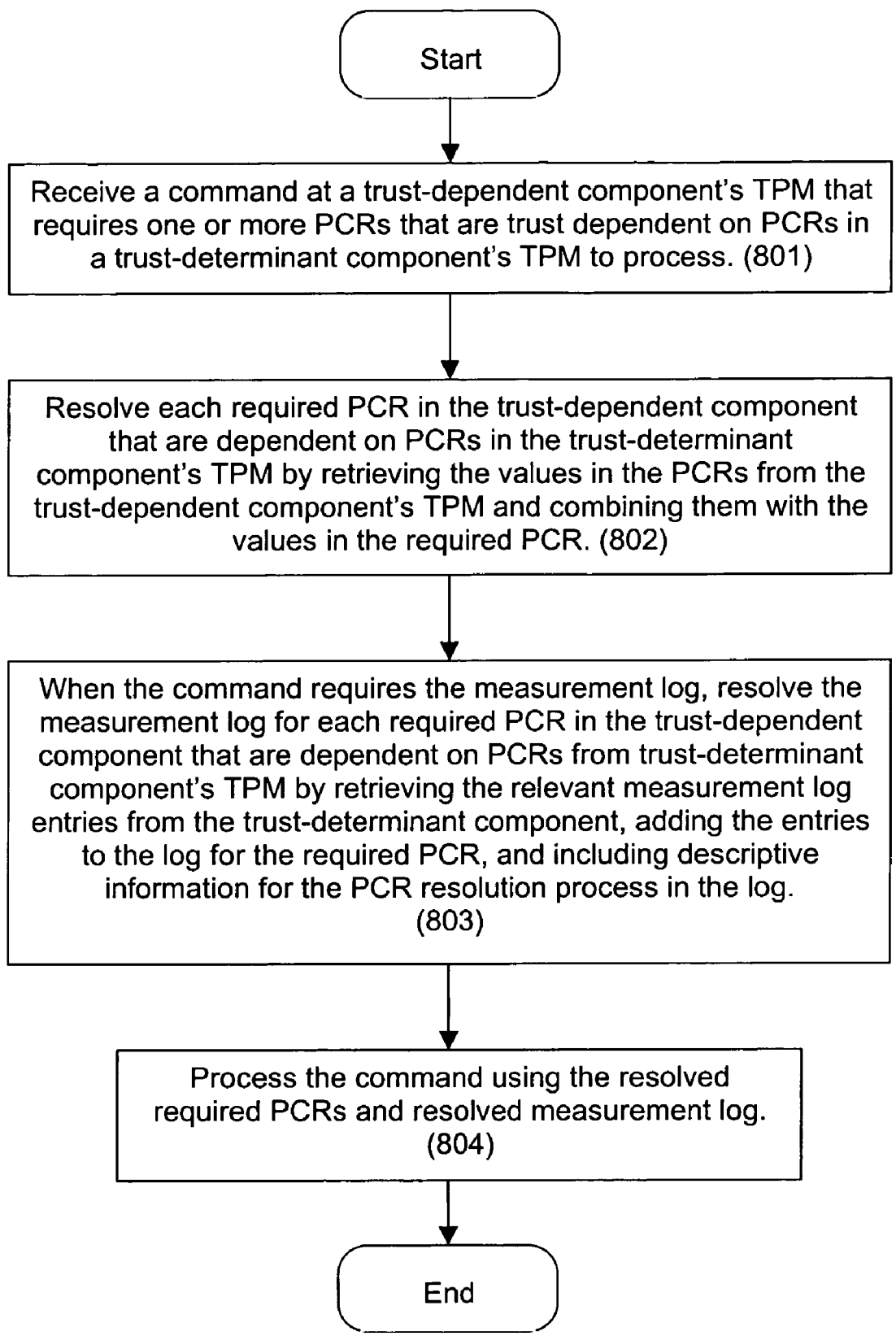
FIG. 8 is a flowchart detailing a process of resolving a Platform Configuration Register (PCR) in a trust-dependent component's TPM.

FIG. 8 is a flowchart detailing a process of resolving one or more PCRs in a trust-dependent component's TPM, according to one embodiment. In 801, a trust-dependent component's TPM receives a command for an operation that requires one or more PCRs, where some of the required PCRs are trust-dependent on PCRs in a trust-determinant component's TPM to process. Such commands include an attestation request, seal request, or unseal request. Then, in 802, the PCR resolution process is started for each required PCR that is trust-dependent on PCRs in the trust-determinant component's TPM. For each such required PCR, the values in the PCRs in the trust-determinant component's TPM on which the required PCR is trust-dependent are retrieved over a secure communications path between the trust-determinant TPM and the trust-dependent TPM. The secure communications path may be protected by cryptographic or other methods, as discussed for FIG. 7.

Then, for each required PCR, the values in the required PCR are combined with the values in the PCRs in the trust-determinant TPM upon which the required PCR is trust-dependent. The method of combining may include a method similar to a PCR extend operation, where the values in the required PCR are concatenated with the values in the PCRs retrieved from the trust-determinant component's TPM in a deterministic order, and a resolution function is computed over the result, yielding the resolved PCR. For the resolve operation to be transparent to the requester, and so as not to degrade security and integrity, the resolution function should either be the same algorithm used to extend the requested PCR or have the same or better security and integrity properties and yield the same size result as the algorithm used to extend the requested PCR. As is known by those with expertise in the field, current Trusted Computing Group (TCG) standards specify a one-way algorithm for the PCR extend function. Current TCG specifications call out SHA-1, and TCG is working on algorithm agility methods that would allow for other algorithms. In addition, in 803, when the command requires the measurement log, the trust-determinant component returns the measurement log for the PCRs whose values it returned, this is combined with the measurement log for the requested PCR, and an entry is added for the PCR resolution process to yield a resolved measurement log, with each entry in the resolved log indicating which component generated it. In 804, the TPM that received the command processes it using the resolved PCR and resolved measurement log. It should be noted that trust dependencies may be within a component as well as across components, e.g., a PCR in a component may be trust-dependent on other PCRs in the same component.

Figure 9:
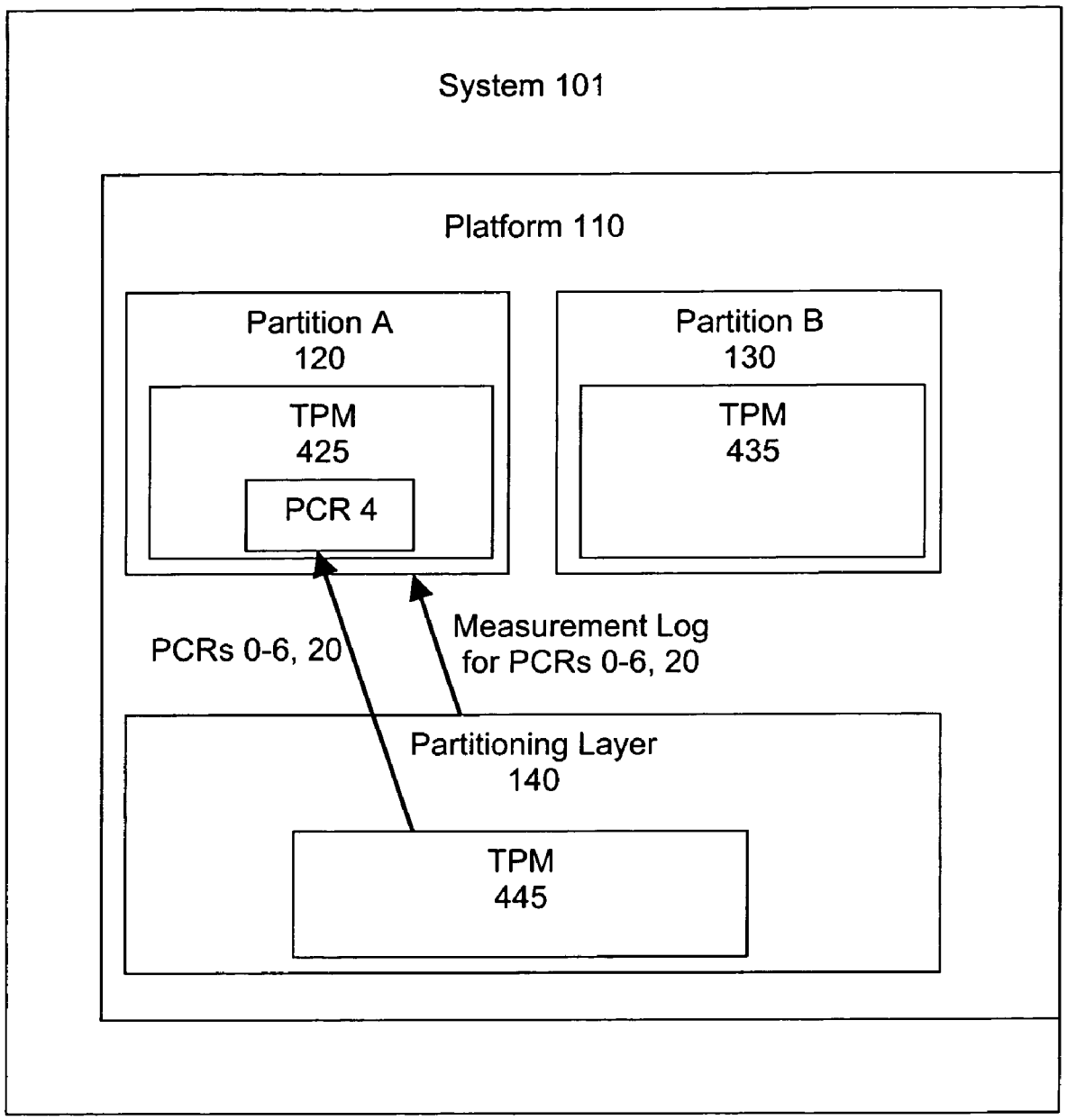
FIG. 9 is a diagram of a dual-layer, partitioned computer system showing information transferred from a trust-determinant component's TPM to resolve a PCR in a trust-dependent component's TPM.

FIG. 9 shows a portion of the PCR resolution process according to one embodiment. In the figure, Platform 110 is a dual-layer partitioned computer system. Partition A 120 and Partition B 130 are trust-dependent on Partitioning Layer 140. PCR 4 in TPM 425 of Partition A 120 is trust-dependent on PCRs 0 through 6 and 20 in TPM 445 of Partitioning Layer 140. Therefore, when TPM 425 receives a command that requires PCR 4, TPM 425 resolves PCR 4 by retrieving the values in PCRs 0 through 6 and 20 of TPM 445 and combining them with the values in its PCR 4. The PCR values may be transferred from TPM 445 to TPM 425 either upon request from TPM 425 when TPM 425 receives a command that requires the PCRs in TPM 445, or whenever the PCRs in TPM 445 change. When the command requires the measurement log, Partition A 120 resolves the measurement log for PCR 4 of its TPM 445 by retrieving the measurement log from the Partitioning Layer 140 for TPM 445's PCRs 0 through 6 and 20, combining the entries with the log for PCR 4 of TPM 425, and including in the resolved log descriptive information for the PCR resolution process.

The command is then processed using the resolved PCR 4 and resolved measurement log for PCR 4. In one embodiment, as a special case, PCR 4 in Partition A 120's TPM 425 may have null values and be a "pass-through" PCR, allowing reference to the values in PCRs in Partitioning Layer 140 from Partition A 120. In this situation, PCR 4 would also have a null measurement log.

Figure 10:
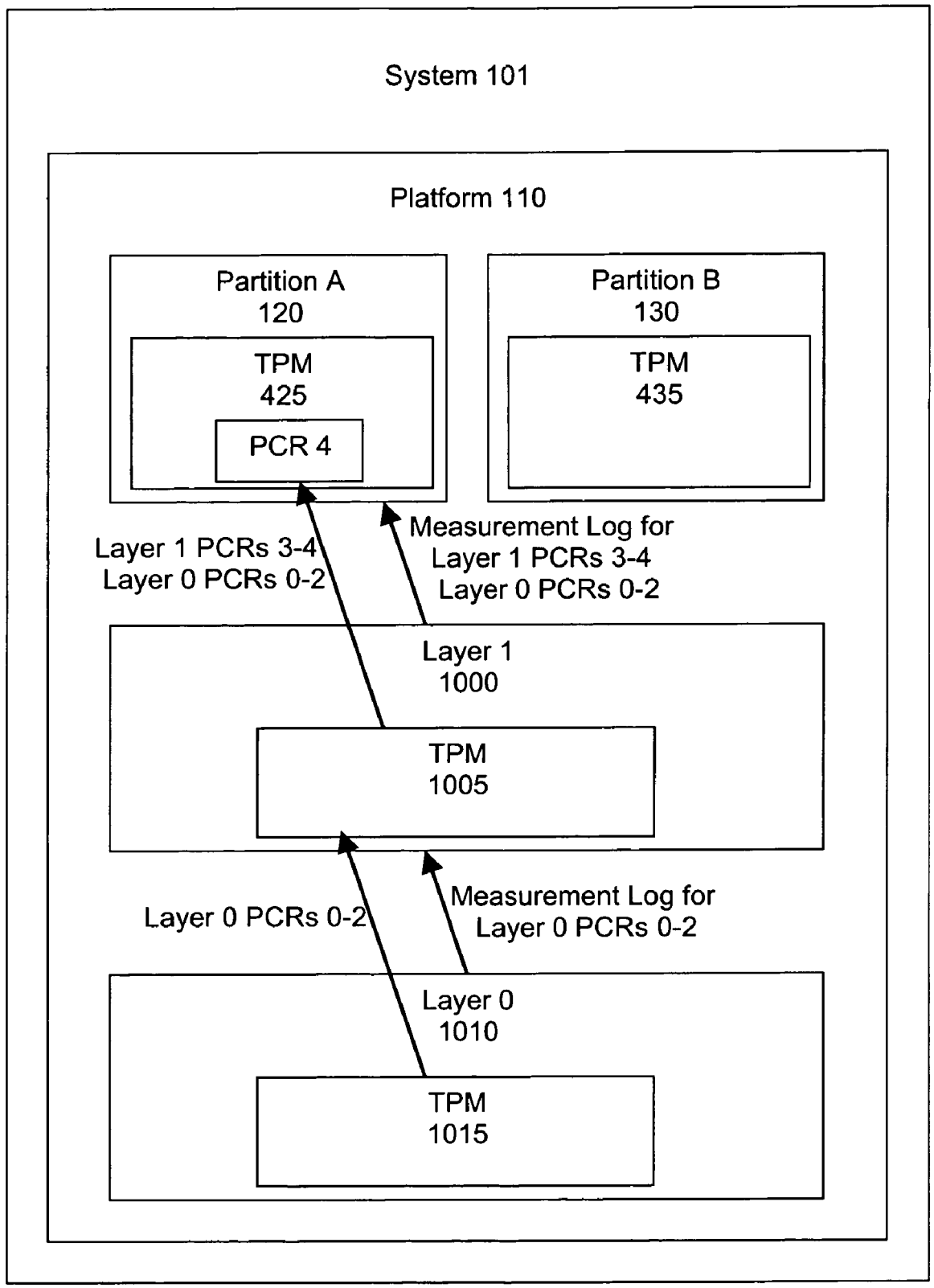
FIG. 10 is a diagram of a tri-layer, partitioned computer system showing information transferred from the trust-determinant component TPM's to resolve PCRs in trust-dependent component TPMs.

FIG. 10 shows a portion of the PCR resolution process according to one embodiment. In the figure, Platform 110 is a dual-layer partitioned computer system. Partition A 120 and Partition B 130 are trust-dependent on Layer 1 1000. Layer 1 1000 is trust-dependent on Layer 0 1010. PCR 4 in TPM 425 of Partition A 120 is trust-dependent on PCRs 3-4 in TPM 1005 of Layer 1 1000. PCR 3 in Layer 1 1000 is trust-dependent on PCRs 0 through 2 in TPM 1015 of Layer 0 1010. In the example depicted, PCR 4 in Layer 1 1000 is also trust-dependent on the same PCRs. Therefore, when TPM 425 receives a command that requires PCR 4, TPM 425 resolves PCR 4 by retrieving the values in PCRs 3 and 4 of TPM 1005 and their dependencies.

The resolution is recursive, with TPM 1005 resolving PCRs 3 and 4 by retrieving the values in PCRs 0 through 2 from TPM 1015 in Layer 0 1010. In one embodiment, TPM 1005 returns to TPM 425 the values in PCRs 3 and 4, as well as the values in TPM 1015's PCRs 0 through 2. Then TPM 425 combines all of those with PCR 4 to obtain the resolved PCR 4. The combine operation is one that takes the values in PCR 4 in TPM 425 and all of the trust-determinant PCR values as input, and returns a value that is the same length as the values in PCR 4 in TPM 425. This includes concatenating with the values in PCR 4 all of the trust-determinant PCR values in a deterministic (i.e., specified and reproducible) order and computing a resolution function (e.g., one-way hash algorithm) over the result. In another embodiment, after TPM 1005 retrieves the values in TPM 1015's PCRs 0 through 2, it concatenates the values in its PCR 3 and PCR 4 with the retrieved PCR values, and computes a resolution function over the concatenation. TPM 1005 then returns the result of the resolution function computation to TPM 425, which concatenates the result to PCR 4 and performs a resolution function computation over the concatenation. Partition A 120 also retrieves the measurement log entries for the trust-determinant PCRs from Layer 1 and combines them with the measurement log entries for the required PCR 4 to yield a resolved measurement log for PCR 4. The measurement log retrieval may be recursive, with Partition A 120 requesting the log for Layer 1 1000 PCR 3 and PCR 4, and Layer 1 1000 requesting the measurement log for PCRs 0 through 2 from Layer 0 1010. As part of the resolution process, methods may optionally be employed to ensure that a particular PCR is not included multiple times.

Figure 11:
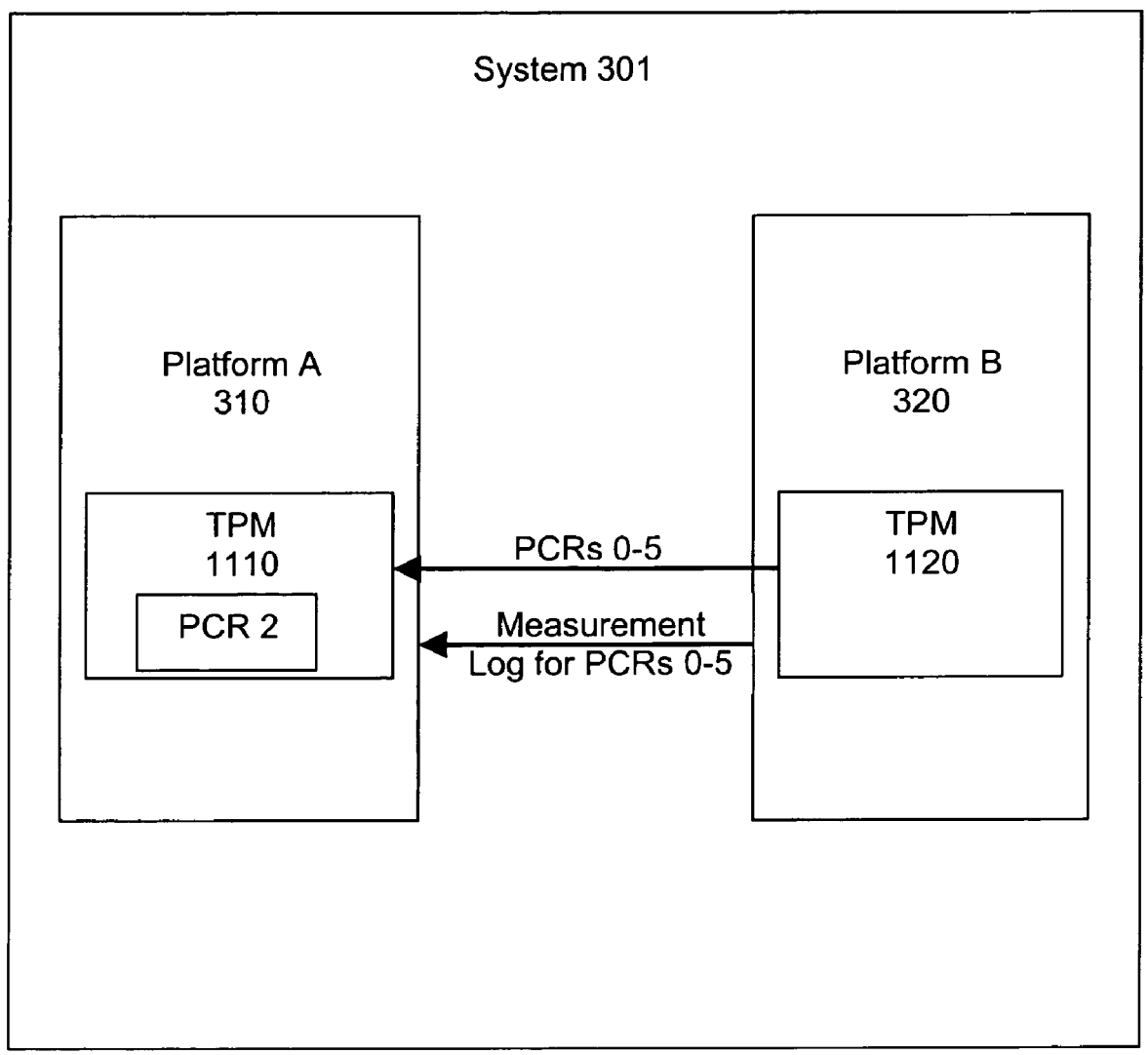
FIG. 11 is a diagram of two platforms with a trust dependency showing the information transferred from the trust-determinant platform to resolve a PCR in a TPM of the trust-dependent platform.

FIG. 11 shows a portion of the PCR resolution process according to one embodiment. In the figure, Platform A 310 is trust-dependent on Platform 320. PCR 2 in TPM 1110 of Platform A 310 is trust-dependent on PCRs 0 through 5 in TPM 1120 of Platform B 320. Therefore, when TPM 1110 receives a command that requires PCR 2, TPM 1110 resolves PCR 2 by retrieving the values in PCRs 0 through 5 of TPM 1120 and combining them with the value in its PCR 2. The PCR values may be transferred from TPM 1110 to TPM 1120 either upon request from TPM 1110 when it receives a command that requires the PCRs in TPM 1120, or whenever the PCRs in TPM 1120 change. When the command requires the measurement log, Platform A 320 resolves the measurement log for PCR 2 of its TPM 1110 by retrieving the measurement log from the Platform B 320 for TPM 1120's PCRs 0 through 5, combining the entries with the log for PCR 2 of TPM 1110, and including in the resolved log descriptive information for the PCR combining operation. The command is then processed using the resolved PCR 2 and resolved measurement log for PCR 2.

Figure 12:
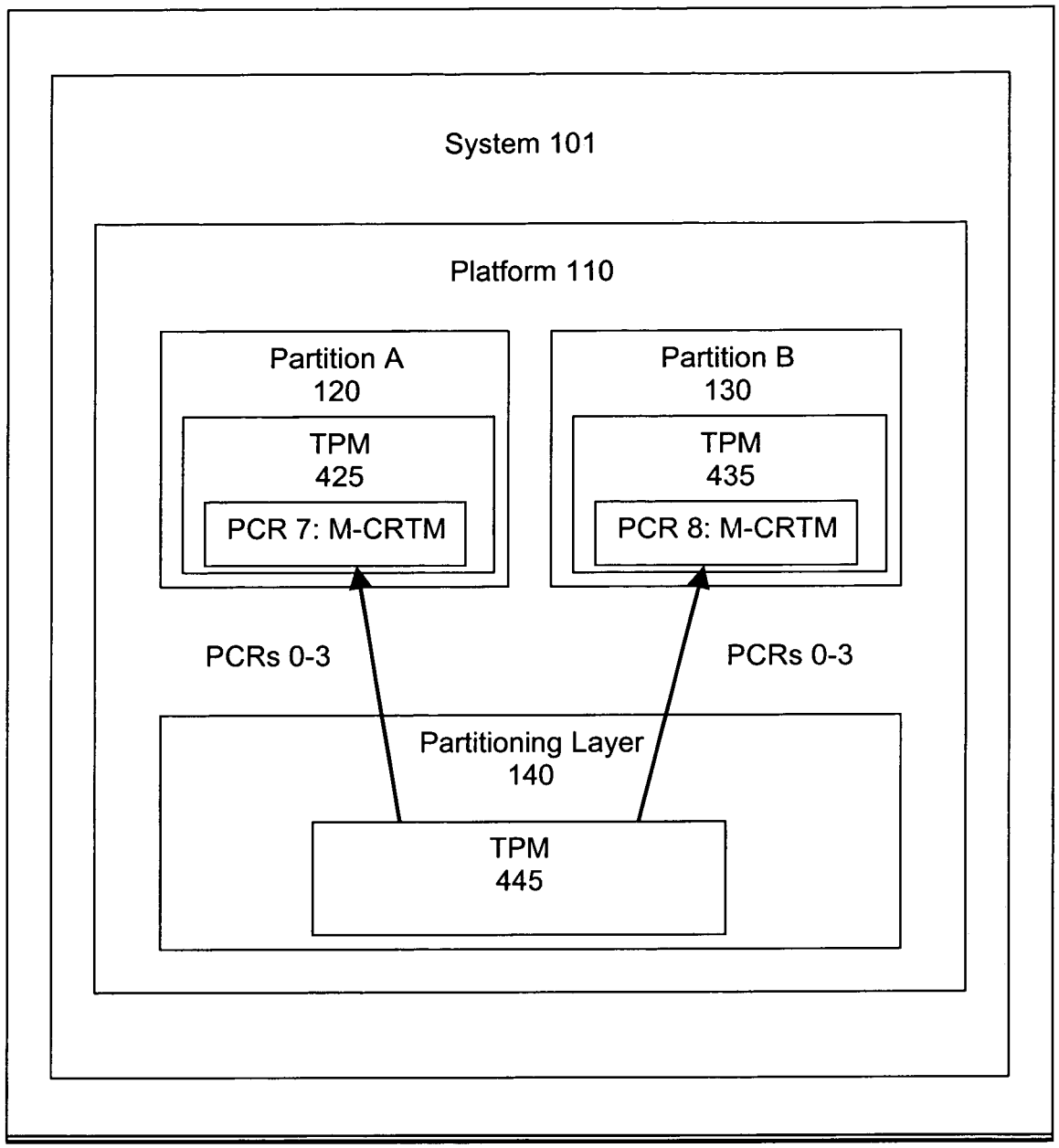
FIG. 12 is a diagram showing a layered, partitioned computer system with the integrity measurement for a partition's Measured Core Root of Trust for Measurement (M-CRTM) stored in the TPM of that partition.

FIG. 12 shows a Measured Core Root of Trust for Measurement (M-CRTM) for trust-dependent components according to one embodiment. As is known by those skilled in the field, current TCG standards define a single CRTM for a component, and allow for the CRTM to be either an S-CRTM or a D-CRTM. This invention describes a third option for a trust-dependent component, an M-CRTM, a type of CRTM that is measured by one or more trust-determinant components. As in the TCG specifications, this invention does not require a trust-dependent component to have an M-CRTM. A trust-dependent component may have an S-CRTM or a D-CRTM (rather than an M-CRTM). In the figure, Platform 110 is a dual-layer partitioned computer system. Partition A 120 and Partition B 130 are trust-dependent on Partitioning Layer 140. In the figure, the CRTM for Partition A 120 is neither an S-CRTM or a D-CRTM. Instead, it is measured (e.g., by computing a one-way hash algorithm over it) by Partitioning Layer 140, and hence called an M-CRTM. Similarly for Partition B 130. In this embodiment, the integrity measurement for Partition A 120's M-CRTM is stored in PCR 7 in Partition A 120's TPM 425. The integrity measurement for Partition B 130's M-CRTM is stored in PCR 8 in Partition B 130's TPM 435. A trust dependency exists for the PCRs in which the M-CRTM are stored on the trust-determinant PCRs within Partitioning Layer 140 containing the integrity measurements for the chain of trust that computed the integrity measurement of the M-CRTM for each partition. In the figure, the trust-determinant PCRs are PCRs 0 through 3 of Partitioning Layer 140. A trust dependency on PCR 7 in TPM 425 exists for the other PCRs in the TPM 425. Similarly, a trust dependency on PCR 8 in TPM 435 exists for the other PCRs in the TPM 435.

Figure 13:
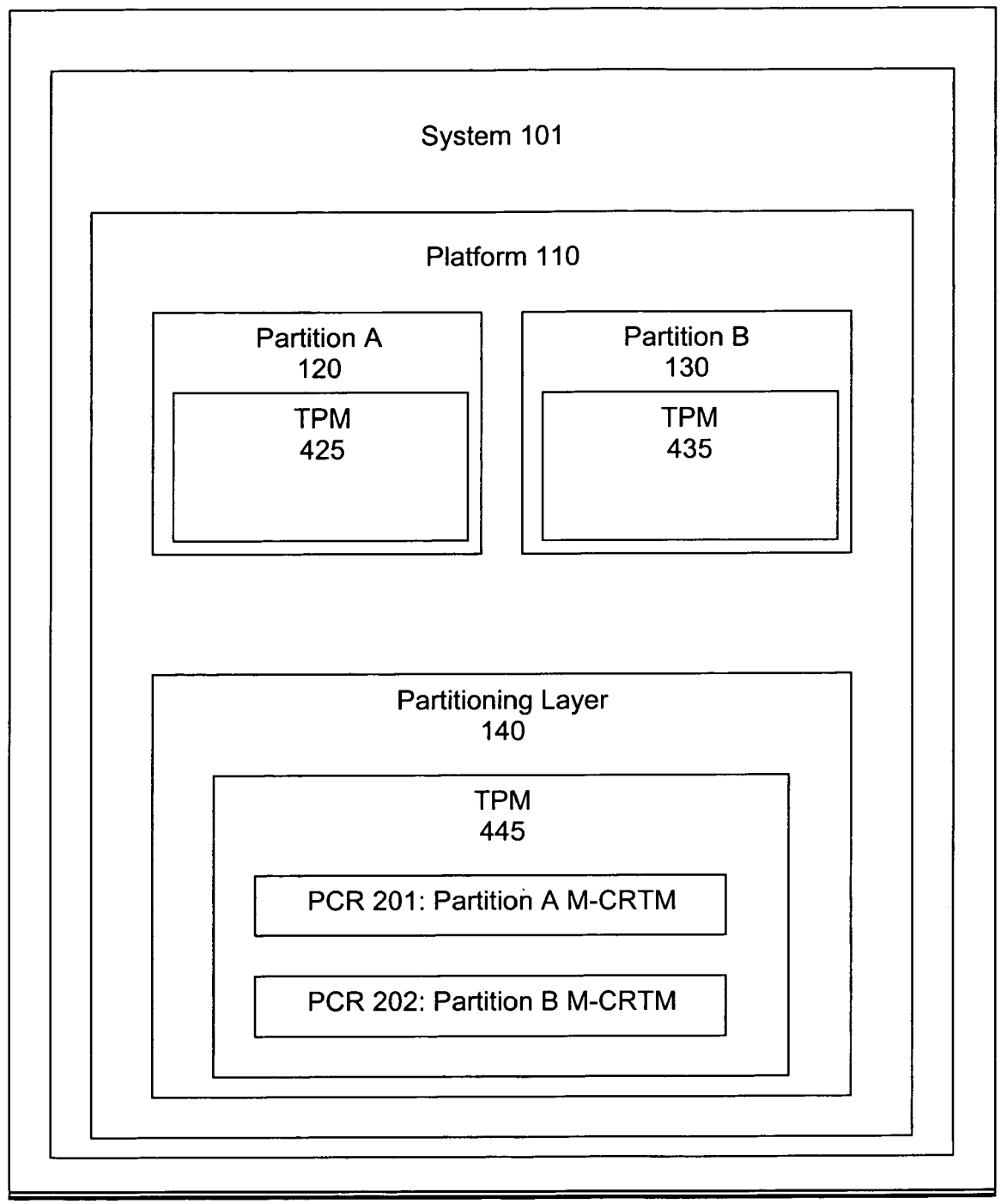
FIG. 13 is a diagram showing a layered, partitioned computer system with the integrity measurement for a partition's M-CRTM stored in the TPM of the partitioning layer.

FIG. 13 shows a Measured Core Root of Trust for Measurement (M-CRTM) according to one embodiment. In the figure, Platform 110 is a dual-layer partitioned computer system. Partition A 120 and Partition B 130 are trust-dependent on Partitioning Layer 140. In the figure, the CRTM for Partition A 120 is neither an S-CRTM or a D-CRTM. Instead, it is measured (e.g., by computing a one-way hash algorithm over it) by Partitioning Layer 140, and hence called an M-CRTM. Similarly for Partition B 130. In this embodiment, the integrity measurement for Partition A 120's M-CRTM is stored in PCR 201 of Partitioning Layer 140's TPM 445. The integrity measurement for Partition B 130's M-CRTM is stored in PCR 202 in Partitioning Layer 134's TPM 445. A trust dependency exists for the PCRs in which the M-CRTM are stored on the trust-determinant PCRs within Partitioning Layer 140 containing the integrity measurements for the chain of trust that computed the integrity measurement of the M-CRTM for each partition. In addition, a trust dependency exists for the PCRs in Partition A 120's TPM 425 on PCR 201 in TPM 445 containing Partition A 120's M-CRTM. Similarly, a trust dependency exists for the PCRs in Partition B 130's TPM 435 on PCR 202 in TPM 445 containing Partition B 130's M-CRTM.

Figure 14:
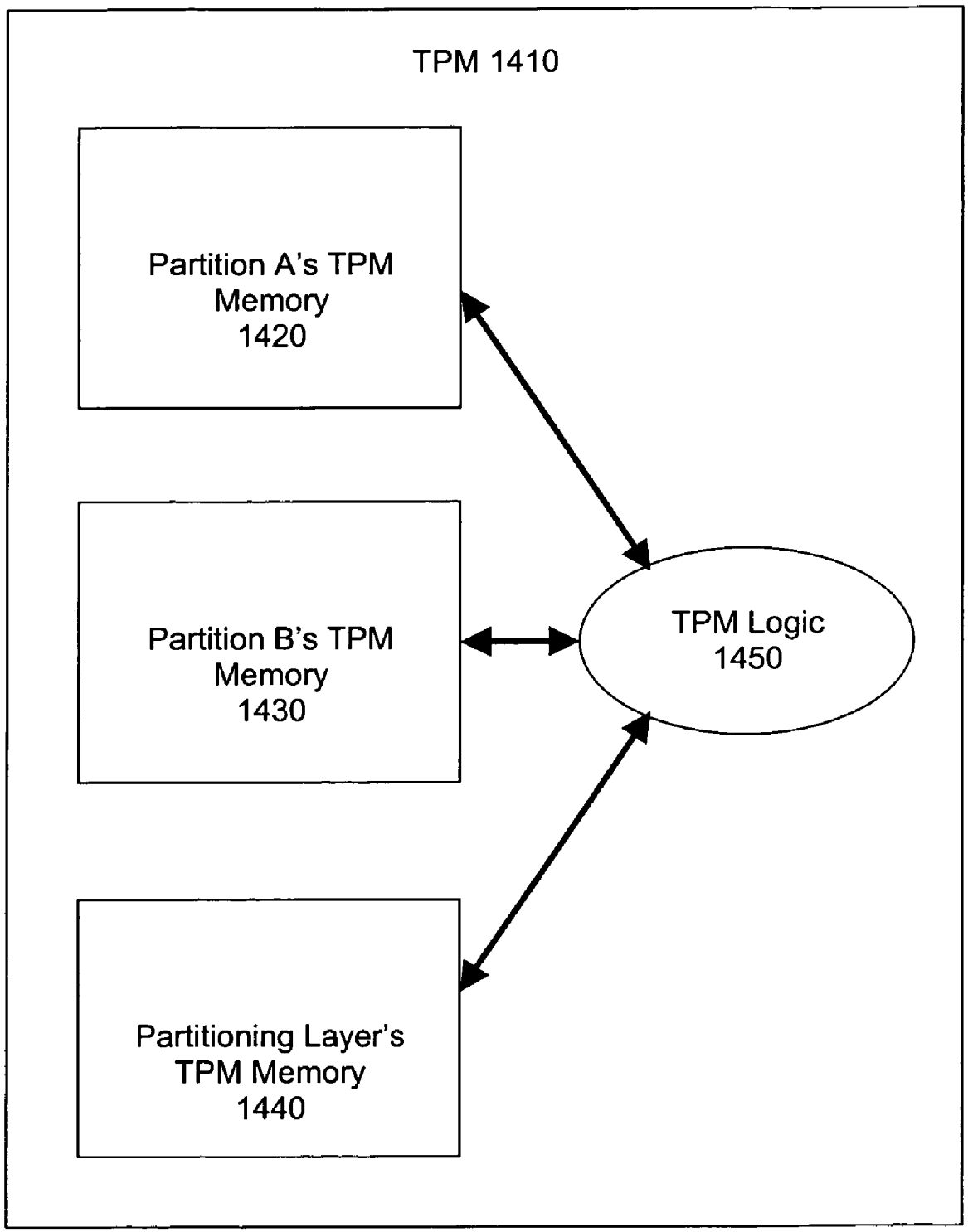
FIG. 14 is a diagram showing a TPM whose memory is partitioned and layered to match the partitioning and layering of the host.

FIG. 14 is a diagram showing a virtualizable TPM 1410 capable of supporting a dual-layered partitioned server such as that in FIG. 1, according to one embodiment. TPM 1410's internal memory partitioned and layered to match the partitioning and layering of the server. Thus, Partition A has its own TPM Memory 1420 within TPM 1410, Partition B has its own TPM Memory 1430 within TPM 1410, and Partitioning Layer has its own TPM Memory 1440. TPM Logic 1450 has access to the TPM memory for Partition A, Partition B and the Partitioning Layer. When dependencies need to be resolved, TPM Logic 1450 can access the appropriate memory areas to get the trust-determinant PCR values.

Figure 15:
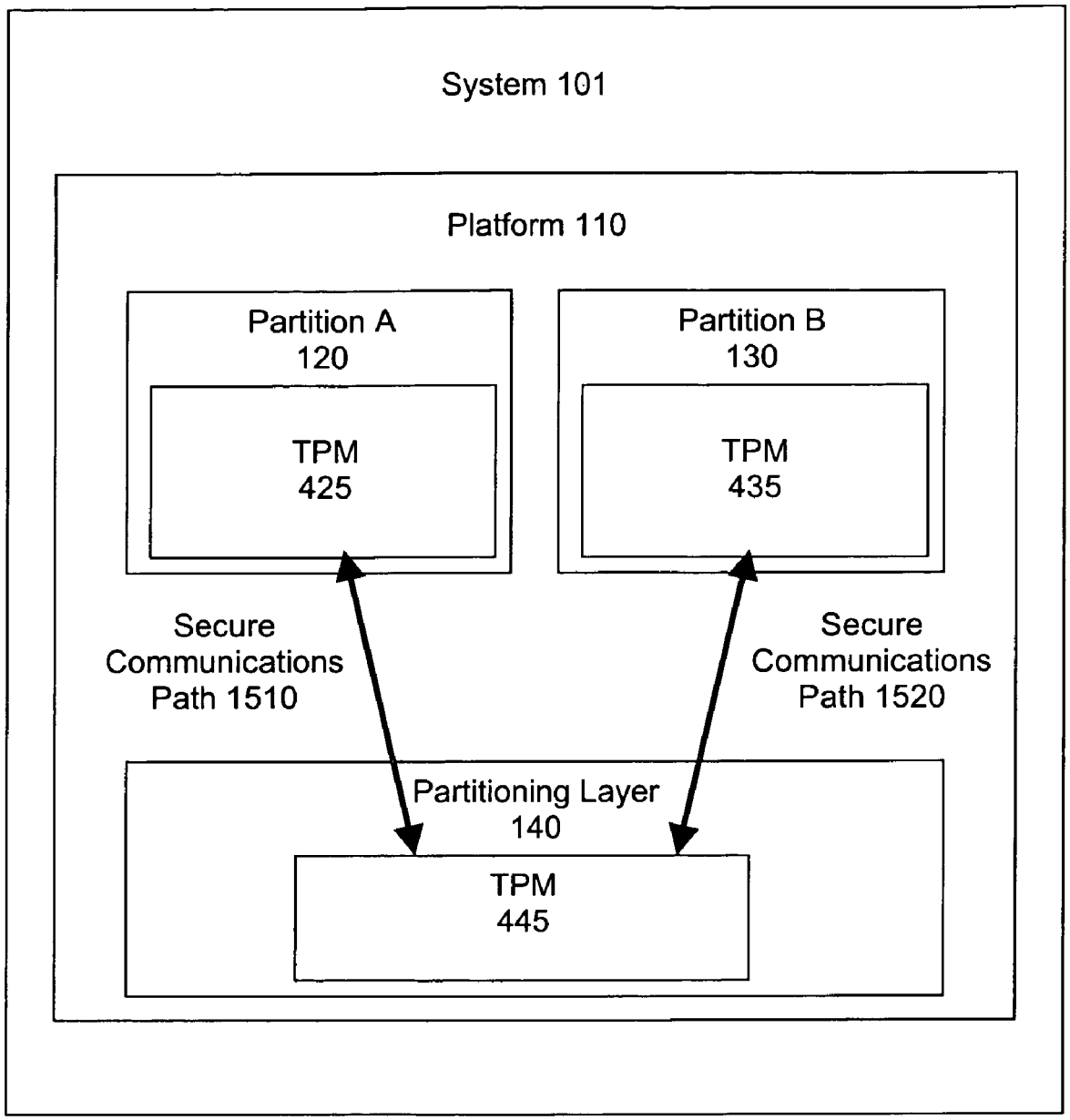
FIG. 15 is a diagram showing TPMs in each partition and in the partitioning layer, with the partition's TPM communicating with the TPM of the partitioning layer over a secure communications path.

FIG. 15 is a diagram showing TPMs in Partition A 120, Partition B 130, and in Partitioning Layer 140. Partition A 120 and Partition B 130 are trust-dependent on Partitioning Layer 140. When a PCR in Partition A's TPM 425 needs to be resolved, the trust-determinant PCR values in Partitioning Layer 140's TPM 445 are communicated to TPM 425 over a secure communications path. Similarly for trust-dependent PCRs in Partition B's TPM 435. Securing the communications path includes protecting the integrity of the information in transit, and mutual authentication of the communicating parties.

Methods for securing the communications path include cryptography or physical security. One cryptographic method is attestation, whereby TPM 425 may send a challenge to TPM 445, and receive a digitally signed response from TPM 445, according to Trusted Computing Group standards. Another cryptographic method would be to establish an encrypted connection between TPM 425 and TPM 445, and transfer in encrypted form the values in the trust-determinant PCRs in TPM 445 to TPM 425. Physical security methods include physical protection of the communications path between TPM 425 and TPM 445. The physical protection methods may either prevent attacks on the communications path or allow detection that attacks have been attempted. Physical protection methods include secure computer rooms housing the platform, tamper evident locks on the cabinets housing the TPMs and the communications path, or protection of the links with methods such as pressurized conduit, fiber optic intrusion detection, potted circuitry, etc.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Computer code can also be embodied as logic, which can be in the form of hardware or software. The logic, once described, can be synthesized to define one or more integrated circuits or components. The logic can therefore be combined to define a system, that in turn can process the defined functionality.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A method for dependent trust in a computer system, comprising method operations of, defining a trust dependency among components of the computer system, wherein the defining includes defining a set of Platform Configuration Registers (PCRs), which are hardware, in a trust-determinant component's Trusted Platform Module (TPM) that a PCR in a trust-dependent component's TPM is trust-dependent upon;

resolving the trust dependency, wherein resolving the trust dependency is recursive when a trust-determinant component is trust-dependent on another trust-determinant component;

performing a security operation using the resolved trust dependency;

computing an integrity measurement for a Core Root of Trust for Measurement (CRTM) of the trust-dependent component, wherein the computing of the integrity measurement is performed by the trust-determinant component; and recording the integrity measurement of the Measured-CRTM (M-CRTM) in a PCR of the TPM of the trust-dependent component.

2. The method of claim 1, wherein
the trust-determinant component is a partitioning layer and the trust-dependent component is a partition.

3. The method of claim 1, wherein the method of defining a trust dependency relationship includes one or both of,
(a) providing the trust dependency relationship over a secure administrative path from an authorized trusted administrator; and
(b) providing logic within the computer system that defines the trust dependency relationship.

4. The method of claim 1, wherein resolving the trust dependency in a component of the computer system includes,
retrieving from the trust-determinant component's TPM PCR values upon which a first PCR in the trust-dependent component's TPM is trust-dependent;
combining the retrieved PCR values with a value in the first PCR to yield a resolved PCR;
retrieving from the trust-determinant component measurement logs for PCRs upon which the first PCR is trust-dependent; and
combining the retrieved measurement log with the measurement log of the first PCR to yield a resolved measurement log.

5. The method of claim 4, wherein the method operation of combining the retrieved PCR values with the value in the first PCR includes,
concatenating the value in first PCR and the retrieved values in the trust-determinant component PCRs in a deterministic order to produce a result; and
computing a resolution function over the result of the concatenation to yield the resolved PCR.

6. The method of claim 5, wherein a value in the first PCR inputted to the concatenation operation can be a null value.

7. The method of claim 4, wherein the method operation of combining the retrieved measurement log with the measurement log of the first PCR includes,
concatenating the measurement log of the first PCR, the retrieved measurement log, and a description of the PCR resolution process.

8. The method of claim 7, wherein a measurement log of a PCR inputted to the concatenation operation can be null.

9. The method of claim 4, wherein the PCR values are retrieved over a secure communications path between the TPM of the trust-dependent component and the TPM of the trust-determinant component.

10. The method of claim 1, wherein performing a security operation includes,
generating an attestation reply using a resolved PCR and a resolved measurement log as input;
performing a seal operation reply using the resolved PCR as input; and
performing an unseal operation reply using the resolved PCR as input.

11. The method of claim 1, wherein recording the integrity measurement of the M-CRTM in a PCR of a TPM includes,
recording an entry describing how the M-CRTM integrity measurement was computed in a measurement log associated with the TPM in which the M-CRTM integrity measurement is stored.

12. The method of claim 1, wherein defining the trust dependency relationship includes,
defining a trust dependency relationship between the PCR in which the integrity measurement of the M-CRTM is stored and PCRs in the trust-determinant component containing integrity measurements for a chain of trust that computes the integrity measurement of the M-CRTM.

13. A system comprising logic encoded in one or more non-transitory media that when executed by a processor performs the following operations:
defining a trust dependency among components of the computer system wherein the defining includes defining a set of Platform Configuration Registers (PCRs), which are hardware, in a trust-determinant component's Trusted Platform Module (TPM) that a PCR in a trust-dependent component's TPM is trust-dependent upon;
resolving the trust dependency, wherein resolving the trust dependency is recursive when a trust-determinant component is trust-dependent on another trust-determinant component;
performing a security operation using the resolved trust dependency;
computing an integrity measurement for a Core Root of Trust for Measurement (CRTM) of the trust-dependent component, wherein the computing of the integrity measurement is performed by the trust-determinant component; and
recording the integrity measurement of the Measured-CRTM (M-CRTM) in a PCR of the TPM of the trust-dependent component.

14. The system of claim 11, wherein the trust-determinant component is a partitioning layer and the trust-dependent component is a partition.

15. The system of claim 13, wherein the logic for defining a trust dependency relationship includes one or both of,
(a) logic for providing the trust dependency relationship over a secure administrative path from an authorized trusted administrator; and
(b) logic for providing logic within the computer system that defines the trust dependency relationship.

16. The system of claim 13, wherein the logic for resolving the trust dependency in a component of the computer system includes,
logic for retrieving from the trust-determinant component's TPM PCR values upon which a first PCR in the trust-dependent component's TPM is trust-dependent;
logic for combining the retrieved PCR values with a value in first PCR to yield a resolved PCR;
logic for retrieving from the trust-determinant component measurement logs for PCRs upon which the first PCR is trust-dependent; and
logic for combining the retrieved measurement log with the measurement log of the first PCR to yield a resolved measurement log.

17. The system of claim 16, wherein the logic for combining the retrieved PCR values with the value in the first PCR includes,
logic for concatenating the value in first PCR and the retrieved values in the trust-determinant component PCRs in a deterministic order to produce a result; and
logic for computing a resolution function over the result of the concatenation to yield the resolved PCR.

18. The system of claim 17, wherein a value in the first PCR inputted to the concatenation operation can have a null value.

19. The system of claim 17, wherein a measurement log of a PCR inputted to the concatenation operation can be null.

20. The system of claim 16, wherein the logic for combining the retrieved measurement log with the measurement log of the first PCR includes,
logic for concatenating the measurement log of the first PCR, the retrieved measurement log, and a description of the PCR resolution process.

21. The system of claim 16, wherein the PCR values are retrieved over a secure communications path between the TPM of the trust-dependent component and the TPM of the trust-determinant component.

22. The system of claim 13, wherein logic for performing a security operation includes,
   logic for generating an attestation reply using a resolved PCR and a resolved measurement log as input;
   logic for performing a seal operation reply using the resolved PCR as input; and
   logic for performing an unseal operation reply using the resolved PCR as input.

23. The system of claim 13, wherein the logic for recording the integrity measurement of the M-CRTM in a PCR of a TPM includes,
   logic for recording an entry describing how the M-CRTM integrity measurement was computed in a measurement log associated with the TPM in which the M-CRTM integrity measurement is stored.

24. The system of claim 13, wherein the logic for defining the trust dependency relationship includes,
   logic for defining a trust dependency relationship between the PCR in which the integrity measurement of the M-CRTM is stored and PCRs in the trust-determinant component containing integrity measurements for a chain of trust that computes the integrity measurement of the M-CRTM.

25. A method for dependent trust in a computer system, comprising method operations of,
   (a) defining a trust dependency among components of the computer system, the trust dependency among components is comprised of identifying,
      (i) one or more trust-determinant components that a trust-dependent component is trust-dependent on, and
      (ii) a set of Platform Configuration Registers (PCRs), which are hardware, in a trust-determinant component's Trusted Platform Module (TPM) that a first PCR in the trust-dependent component's TPM is trust-dependent upon, wherein the trust-determinant component is a partitioning layer and the trust-dependent component is a partition;
   (b) resolving the trust dependency, the resolving including,
      (i) retrieving from the trust-determinant component's TPM PCR values upon which the first PCR in the trust-dependent component's TPM is trust-dependent;
      (ii) combining the retrieved PCR values with a value in the first PCR to yield a resolved PCR;
      (iii) retrieving from the trust-determinant component measurement logs for PCRs upon which the first PCR is trust-dependent; and
      (iv) combining the retrieved measurement log with a measurement log of the first PCR to yield a resolved measurement log, wherein resolving the trust dependency is recursive when a trust-determinant component is trust-dependent on another trust-determinant component; and
   (c) performing a security operation using the resolved trust dependency;
   (d) computing an integrity measurement for a Core Root of Trust for Measurement (CRTM) of a trust-dependent component, wherein the computing of the integrity measurement is performed by the trust-determinant component; and
   (e) recording the integrity measurement of the Measured-CRTM (M-CRTM) in a PCR of a TPM in the trust-dependent component.

26. The method of claim 25, wherein the TPM is either a TPM of the trust-dependent component or a TPM of the trust determinant component.

27. The method of claim 25, wherein the method operation of combining the retrieved PCR values with the value in the first PCR includes,
   concatenating the value in first PCR and the retrieved values in the trust-determinant component PCRs in a deterministic order to produce a result; and
   computing a resolution function over the result of the concatenation to yield the resolved PCR.

28. The method of claim 25, wherein the method operation of combining the retrieved measurement log with the measurement log of the first PCR includes,
   concatenating the measurement log of the first PCR, the retrieved measurement log, and a description of the PCR resolution process.

29. The method of claim 25, wherein performing a security operation includes,
   generating an attestation reply using the resolved PCR and resolved measurement log as input;
   performing a seal operation reply using the resolved PCR as input; and
   performing an unseal operation reply using the resolved PCR as input.

* * * * *